United States Patent
Wilson et al.

(10) Patent No.: US 10,556,674 B2
(45) Date of Patent: Feb. 11, 2020

(54) COOLING OF A MOTOR FOR DRIVING AN AIRCRAFT WHEEL

(71) Applicants: AIRBUS OPERATIONS LIMITED, Bristol (GB); AIRBUS OPERATIONS GMBH, Hamburg (DE)

(72) Inventors: Fraser Wilson, Bristol (GB); Volker Baumbach, Hamburg (DE)

(73) Assignees: AIRBUS OPERATIONS LIMITED, Bristol (GB); AIRBUS OPERATIONS GmbH, Hamburg (DE)

(*) Notice: Subject to any disclaimer, the term of this patent is extended or adjusted under 35 U.S.C. 154(b) by 583 days.

(21) Appl. No.: 15/346,137

(22) Filed: Nov. 8, 2016

(65) Prior Publication Data

US 2017/0129590 A1 May 11, 2017

(30) Foreign Application Priority Data

Nov. 9, 2015 (GB) .................................. 1519755.1

(51) Int. Cl.
*B64C 25/40* (2006.01)
*F01P 3/20* (2006.01)
*H02K 9/193* (2006.01)

(52) U.S. Cl.
CPC .............. *B64C 25/405* (2013.01); *F01P 3/20* (2013.01); *H02K 9/193* (2013.01); *Y02T 50/823* (2013.01)

(58) Field of Classification Search
CPC ......... B64C 25/405; F01P 3/20; H02K 9/193; Y02T 50/823
See application file for complete search history.

(56) References Cited

U.S. PATENT DOCUMENTS

| | | | | |
|---|---|---|---|---|
| 2,365,126 A | * | 12/1944 | Vickers | ................... B64C 25/40 188/152 |
| 5,109,672 A | * | 5/1992 | Chenoweth | ............. B64C 13/40 60/456 |
| 2006/0065779 A1 | | 3/2006 | McCoskey et al. | |
| 2012/0248850 A1 | | 10/2012 | Hirano | |
| 2013/0181088 A1 | * | 7/2013 | Casado Montero | .. B64C 25/405 244/50 |

(Continued)

FOREIGN PATENT DOCUMENTS

| | | |
|---|---|---|
| GB | 2524242 A | 9/2015 |
| WO | 2011023505 A2 | 3/2011 |
| WO | 2013084011 A1 | 6/2013 |

OTHER PUBLICATIONS

EP Communication in EP Appln. No. 16197827, dated Apr. 7, 2017.

*Primary Examiner* — Rodney A Bonnette
(74) *Attorney, Agent, or Firm* — Nixon & Vanderhye P.C.

(57) ABSTRACT

An aircraft comprises a landing gear assembly on a part of which is mounted a motor for driving a wheel of the landing gear assembly, for example to enable the aircraft to perform taxiing manoeuvres. The motor is a liquid-cooled motor and the liquid that is used to cool the motor is hydraulic fluid, preferably hydraulic fluid taken from a hydraulic system that already exists on the aircraft to supply other consumers of hydraulic fluid pressure on the aircraft. The hydraulic fluid thus has other utility (i.e. other than cooling the motor) on the aircraft and therefore has a significant volume (and therefore a significant heat capacity). There may be a need to convert from high pressure hydraulic fluid to a lower pressure supply.

17 Claims, 6 Drawing Sheets

(56) References Cited

U.S. PATENT DOCUMENTS

2013/0284854 A1  10/2013  Charles et al.
2014/0158820 A1  6/2014  Wilson et al.
2015/0159968 A1  6/2015  Edelson et al.

* cited by examiner

COOLING OF A MOTOR FOR DRIVING AN AIRCRAFT WHEEL

RELATED APPLICATIONS

The present application claims priority from Great Britain Application No. 1519755.1, filed Nov. 9, 2015, the disclosure of which is hereby incorporated by reference herein in its entirety.

BACKGROUND OF THE INVENTION

The present invention concerns a method of and an apparatus for cooling of a motor for driving an aircraft wheel. More particularly, but not exclusively, this invention concerns an aircraft comprising a landing gear assembly having a motor for driving a wheel of the landing gear assembly, wherein the motor requires cooling. The invention also concerns a method of cooling a motor that is being used to drive a landing gear wheel of an aircraft landing gear assembly of an aircraft during taxiing manoeuvres of the aircraft.

Aircraft are required to taxi on the ground, for example between locations on airfields. For example, a commercial passenger aircraft is required to taxi between a runway at an airport and the location at the airport (e.g. a terminal having a departures/arrivals gate) at which the aircraft's passengers are to board or disembark the aircraft. In the prior art, such taxiing has typically been performed by using the thrust from the aircraft's engines to propel the aircraft forwards, so that the wheels on landing gear assemblies of the aircraft are caused to rotate. Since ground taxi speeds are necessarily relatively low, the engines must be run at a very low power. This may mean that there is relatively high fuel consumption as a result of the poor propulsion efficiency at this low power. This can lead to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, for example away from a terminal gate, using its main engines is not permitted. When reversing is necessary, or in other situations where ground taxiing via main engine thrust is not practicable, tow trucks are used to manoeuvre aircraft around. This process is laborious and costly.

It has therefore been proposed that a separate drive system be provided to power the wheels of an aircraft landing gear during ground taxi operations. Such proposed separate drive systems comprise a motor mounted locally to the wheel of a landing gear assembly, typically a hydraulic or electric motor. Torque is provided to the wheel from the motor. Such proposed separate drive systems are referred to as autonomous ground taxi systems and sometimes as e-taxi (electric taxi) systems.

One example is disclosed in US2006/0065779, which proposes a nose aircraft wheel system powered by electric power from an auxiliary power unit (APU) on the aircraft. Another prior art arrangement which is not restricted to nose landing gears is described in WO2011/023505.

For an additional drive system locally mounted on a landing gear assembly to be of benefit it needs to be lightweight, yet able to withstand the harsh conditions that are encountered in the region of a landing gear assembly when the wheels are in contact with the ground. The addition of a drive system on a landing gear assembly should not affect detrimentally the other functions of the landing gear assembly, such as the process of the landing gear moving between deployed and stowed positions and/or such as the braking function provided by the wheel brakes. Safety cannot be compromised.

A motor of an e-taxi/autonomous ground taxi drive system may require cooling in order for it to operate efficiently and safely. Air cooling of a motor may offer a simple means of cooling the motor. Heat exchanging fins may be provided to facilitate cooling of the motor by means of air passing over the fins extracting and carrying away heat as the landing gear assembly moves through ambient air when the aircraft travels relative to the ground. It is believed however that dust, debris and other dirt and unwanted flatter might clog up the fins, thus requiring regular cleaning in order for their effectiveness to be maintained. It has been proposed that fans be provided to assist with cooling and that such fans may be powerful enough to keep the fins clear of debris. The use of high-power fans adds extra mass and may add extra complexity.

US2013/284854 proposes a wheel-mounted e-taxi motor pre-cooled by means of producing airflow through the rotors of the drive motor.

An alternative way in which to cool a motor is by means of liquid cooling. However, the extra mass that would be needed in order to provide a dedicated liquid based cooling system for one or more e-taxi motors is likely to make such an alternative unattractive.

The present invention seeks to mitigate one or more of the above-mentioned problems. Alternatively or additionally, the present invention seeks to provide an improved method, and/or apparatus, for cooling a motor for driving a landing gear wheel on an aircraft. Alternatively or additionally, the present invention seeks to provide an improved method and and/or apparatus for performing aircraft taxiing manoeuvres.

SUMMARY OF THE INVENTION

According to a first aspect of the invention, there is provided an aircraft comprising a landing gear assembly on a part of which is mounted a motor for driving a wheel of the landing gear assembly, the motor being cooled by means of hydraulic fluid. Thus the motor is a liquid-cooled motor, wherein the liquid that is used to cool the motor in use is hydraulic fluid. Preferably the hydraulic fluid is from a hydraulic system of the aircraft, for example a hydraulic system having other utility (i.e. other than cooling the motor) on the aircraft. The hydraulic system may for example be one which powers one or more hydraulically driven parts of the aircraft, such as for example flight control surfaces or the like. As such, it may be that the hydraulic system includes a significant volume of hydraulic fluid. Such a hydraulic system will also typically include one or more hydraulic fluid lines (conduits) for carrying the hydraulic fluid to and/or from a location separate from the landing near assembly.

Thus, according to certain embodiments there is provided a liquid-cooled landing gear wheel motor which utilises hydraulic fluid that would in any case be provided on the aircraft. The use of such fluid therefore offers the potential of a mass-efficient solution to the problem of how best to cool such motors on an aircraft.

The motor may be an electric motor. The electric motor may be configured to operate at an electric power of between 10 kW and 100 kW. The electric motor, including any associated electric power conversion and any associated gearbox, may have a mass of about 150 Kg or less. The aircraft may include two motors each mounted on a different landing gear and each being provided for the purpose of driving one or more wheels of each landing gear.

The motor may be a hydraulic motor.

As mentioned above, the motor may be mounted on a part of the landing gear. The motor may be mounted on a strut of the landing gear assembly. The motor may be mounted on an axle for a wheel of the landing gear assembly. The motor is preferably configured to supply torque to the wheel. It will be understood that the motor is not configured to (or, in any meaningful way, able to) contribute to thrust when the aircraft is in flight.

The volume of hydraulic fluid within the hydraulic system may be greater than 5 litres, and possibly greater than 10 litres. The size and scale of the hydraulic system and the consequent heat capacity of the fluid, together with the ability of the fluid to exchange heat with its surroundings (which may for example include a significant proportion of the body of the aircraft), may provide a convenient, yet efficient, way of transferring heat from the motor.

The hydraulically driven parts of the aircraft powered by the hydraulic system may include one or more flight control surfaces of the aircraft. The hydraulically driven parts of the aircraft powered by the hydraulic system may include one or more slats and/or flaps on the wings of the aircraft. The hydraulically driven pails may include one or more ailerons of the aircraft. The hydraulically driven parts may include one or more spoilers of the aircraft. The hydraulically driven parts may include one or more stabilizers of the aircraft. The hydraulically driven parts may include one or more elevators of the aircraft. The hydraulically driven parts may include a rudder of the aircraft.

The hydraulically driven parts of the aircraft powered by the hydraulic system may include air brakes and/or wheel brakes on the aircraft. The hydraulically driven parts of the aircraft powered by the hydraulic system may include one or more actuators associated with moving one or more parts of the landing gear assembly. For example, one or more hydraulic actuators may be used to deploy or retract the landing gear. One or more hydraulic actuators may be used in connection with the motor. For example, it may be that the motor is part of a larger drive system for driving the wheel of the landing gear assembly, the drive system including at least one such hydraulic actuator, which is powered by means of hydraulic fluid supplied by the hydraulic system of the aircraft. The drive system, including the motor, may have a total mass of about 150 Kg or less.

It may be that the hydraulic system is configured for powering one or more hydraulically driven parts of the aircraft with fluid at a relatively high pressure. It may be that the liquid cooling system for cooling the motor with hydraulic fluid is configured to operate at a relatively low pressure. There may therefore be one or more devices arranged to convert between such a relatively high pressure hydraulic fluid system and such a relatively low pressure hydraulic fluid system. There may be provided a pressure reducing throttle such that the liquid-cooled motor is connected to the hydraulic system of the aircraft via the throttle. Thus, during use, hydraulic fluid may be supplied via the throttle to be used as the liquid, at relatively low pressure, that cools the motor. Alternatively or additionally, the motor may be connected to the (high pressure) hydraulic system of the aircraft via a tank (for example a pressurised tank) which is configured to hold hydraulic fluid for use as the cooling liquid at relatively low pressure.

A heat exchange apparatus, for example a radiator, may be provided which is arranged to receive hydraulic fluid heated by heat from the motor and to extract heat from the hydraulic fluid. Such a heat exchange apparatus may be provided at a position that is spaced apart from, possibly remote from, the motor. The heat exchange apparatus is preferably located in (or at least adjacent to) the main body of the aircraft when the landing gear is deployed. The heat exchange apparatus may be located in a bay for stowage of the landing gear when the landing gear is not deployed.

The hydraulic system of the aircraft will typically include a hydraulic pump for pressurising the hydraulic fluid. The hydraulic pump will typically be provided on the aircraft and not on or within the landing gear. The hydraulic pump will typically be sufficient to pressurise the hydraulic fluid to a pressure high enough for powering one or more hydraulically driven parts of the aircraft (other than the motor). A low-pressure pump delivering fluid to the motor for the purpose of cooling the motor may be provided. Such a low-pressure pump may be provided locally to the motor and may, for example, be provided on or within the landing gear.

The aircraft may be a commercial passenger aircraft (i.e. a civil aircraft), for example with seats for at least 50 passengers.

According to a second aspect of the invention, there is provided a method of cooling a motor that is being used to drive a landing gear wheel of an aircraft landing gear assembly of an aircraft during taxiing manoeuvres of the aircraft. The method includes a step of circulating hydraulic fluid from a hydraulic system of the aircraft to extract heat from the motor.

It may be that more than one motor may be cooled with the same hydraulic system.

It may be that the pressure of at least some of the hydraulic fluid in the hydraulic system of the aircraft is 10 times greater than the pressure of at least some of the hydraulic fluid used to cool the motor. It may be that the pressure of at least some of the hydraulic fluid in the hydraulic system of the aircraft is greater than 5 MPa. The pressure of at least some of the hydraulic fluid in the hydraulic system of the aircraft may be greater than 10 MPa. It may be that the pressure of at least some of the hydraulic fluid when used to cool the motor is less than 2.5 MPa.

It may be that when cooling the motor, the motor is immersed (partly or fully immersed for example) in a flow of the hydraulic fluid. It may be that the hydraulic fluid flows within the interior of the motor. There may, for example, be channels in the motor adapted for that purpose. During the method, hydraulic fluid may flow through such channels. The hydraulic fluid will typically be relatively cool, as a result of the inherent/natural cooling that for example occurs during operation of the hydraulic system during flight, where ambient air temperature will typically effect cooling.

The present invention also provides a liquid-cooled motor, for example an e-taxi motor, being configured for use as the motor of the aircraft of the first aspect of the invention as claimed or described herein, including any optional features relating thereto. The present invention also provides a liquid-cooled motor, for example an e-taxi motor, being configured for use as the motor of the method of the second aspect of the invention as claimed or described herein, including any optional features relating thereto. The liquid-cooled motor may be specifically adapted for mounting on a part of a landing gear assembly for the purpose of driving a wheel of the landing gear assembly. The liquid cooled motor may be provided as a part of a kit of parts for installation on an aircraft. The kit of parts may include an inlet arranged to facilitate the flow of hydraulic fluid from a separate hydraulic circuit on an aircraft to the liquid-cooled motor for the purpose of cooling the motor. The kit of parts may include an outlet arranged to facilitate the flow of hydraulic fluid that has extracted heat from the liquid-cooled motor, to a separate hydraulic circuit on an aircraft. Such a kit may include one or more hydraulic fluid conduits for carrying the hydraulic fluid to and/or from a location separate from the landing gear assembly.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
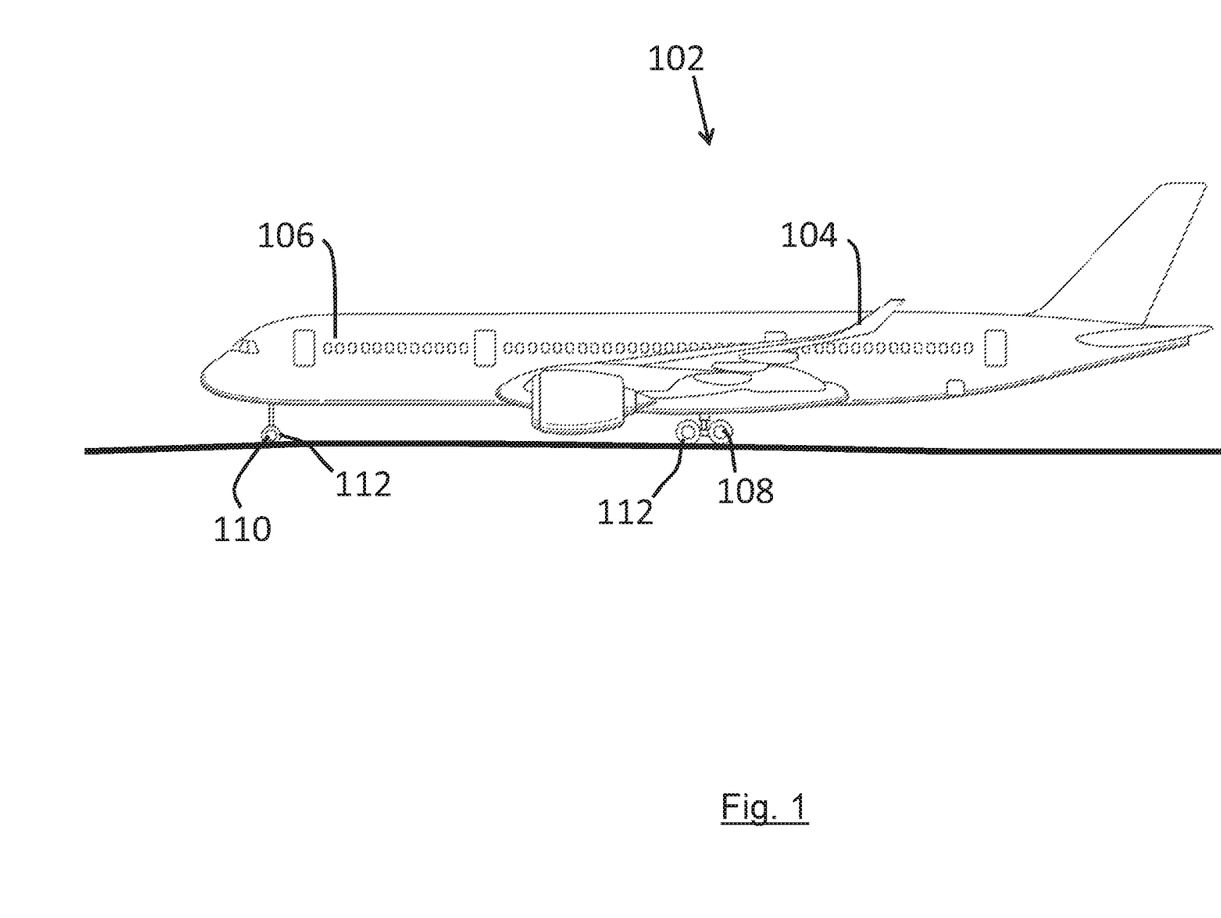
FIG. 1 shows an aircraft according to a first embodiment of the invention.

FIG. 1 shows an aircraft 102 comprising a pair of wings 104 and a fuselage 106. The wings each carry an engine. The aircraft 102 is supported on the ground by sets of landing gear assemblies comprising a main landing gear (MLG) 108 and a nose landing gear (NLG) 110. The landing gear assemblies comprise wheels 112 which are shown in FIG. 1 in contact with the ground (e.g. runway or taxiway). The landing gear assemblies are mounted for movement between a deployed position in which the main strut of each landing gear is generally vertical and a stowed position in which the strut is generally horizontal.

Figure 2:
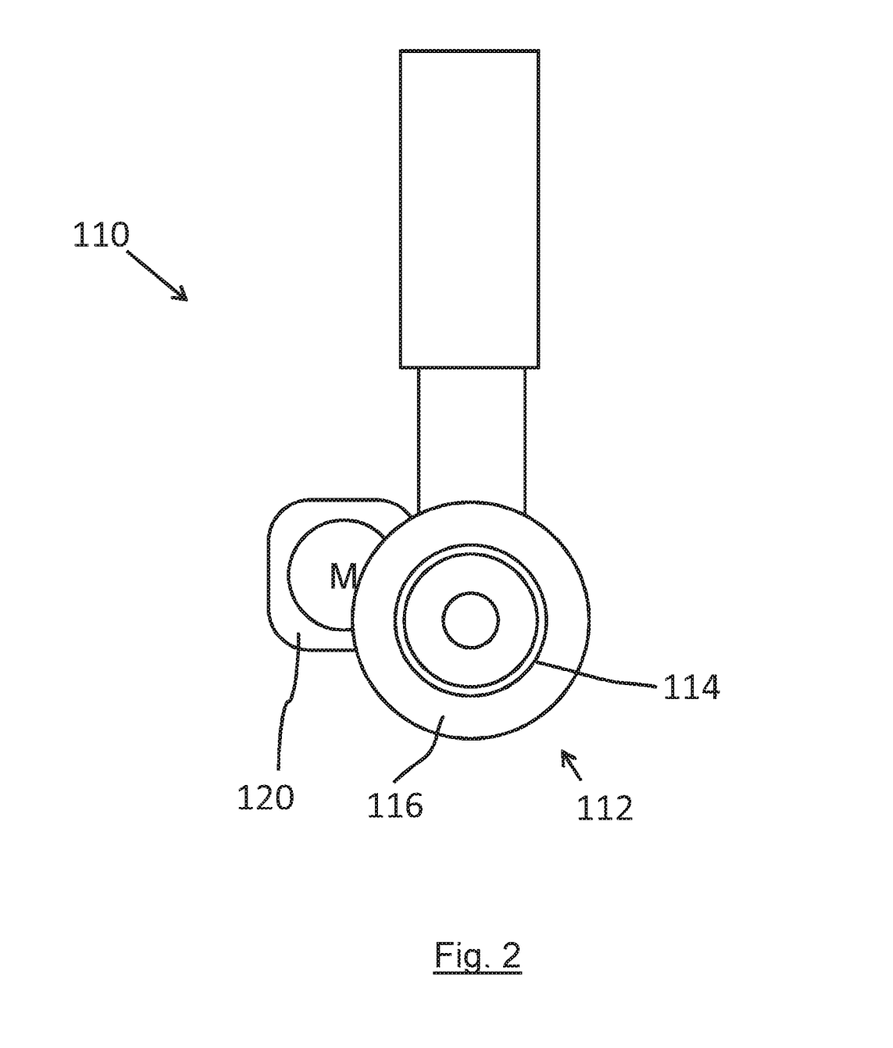
FIG. 2 shows a landing gear assembly of the aircraft of FIG. 1 with an e-taxi motor mounted on the landing gear assembly.

The NLG 110 is shown in greater detail in FIG. 2 together with a schematic illustration of a wheel 112. Parts of the landing gear 110 including, for example, the axles for mounting the wheels and the upper part of the landing gear assembly have been omitted from FIG. 2 for the sake of clarity. Each wheel 112 comprises a rim 114 on which there is mounted a tyre 116. On the landing gear there is mounted a 40 kW electric motor 120 for supplying torque to the wheel 112. The electric motor 120 is provided to drive the wheel during taxiing manoeuvres so that the main aircraft engines (or a tow-truck) may be rendered unnecessary during taxiing of the aircraft. As such the motor will be referred to as the e-taxi motor 120.

The e-taxi motor 120 is cooled with hydraulic fluid supplied from a hydraulic system of the aircraft that has as its primary function the supplying of hydraulic power to flight control surfaces of the aircraft. The aircraft of the present embodiment has three principal hydraulic circuits that supply power to various parts of the aircraft. Two circuits are associated with hydraulic pumps that are powered by the engines of the aircraft and a third is instead powered by means of an electric pump. The hydraulic circuits are referred to as a matter of convenience by means of a colour. Thus, there is a yellow hydraulic circuit, a green hydraulic circuit and a blue hydraulic circuit. (It will be understood that the colours referred to are being used as convenient labels, and could equally be referred to as "hydraulic circuit number 1", "hydraulic circuit number 2", and "hydraulic circuit number 3".) It is convention to name the circuit that is powered by the left engine hydraulic pump as the green system and to name the circuit that is powered by the right engine hydraulic pump as the yellow system. The blue system is pressurised by means of an electric pump. During normal operation, each hydraulic circuit operates at a pressure in the region of between about 2,500 and about 5,000 psi (between about 17 MPa and 35 MPa), with a typical value being of the order of 3000 psi (about 20 MPa or about 200 bar). Some systems may operate at higher pressures (now or in the future), for example up to pressures of the order of 10,000 psi (about 70 MPa). The yellow and green circuits are each able to supply hydraulic power to the flight control surfaces (including the stabilizers, the elevators, the rudder, the flaps/slats on the wings, and the ailerons) and to the landing gear. The provision of three separate systems provides redundancy in the case of failure of one of the hydraulic systems.

In this embodiment, it is the yellow system, and only the yellow system, of the aircraft that is used to supply hydraulic fluid to the motor for the purpose of cooling the motor during operation. The yellow system is also used to provide hydraulic power to an actuator in the landing gear for selectively causing the e-taxi motor to engage with, or disengage from, driving the wheel. About 30 litres of hydraulic fluid are used within the yellow system.

Figure 3:
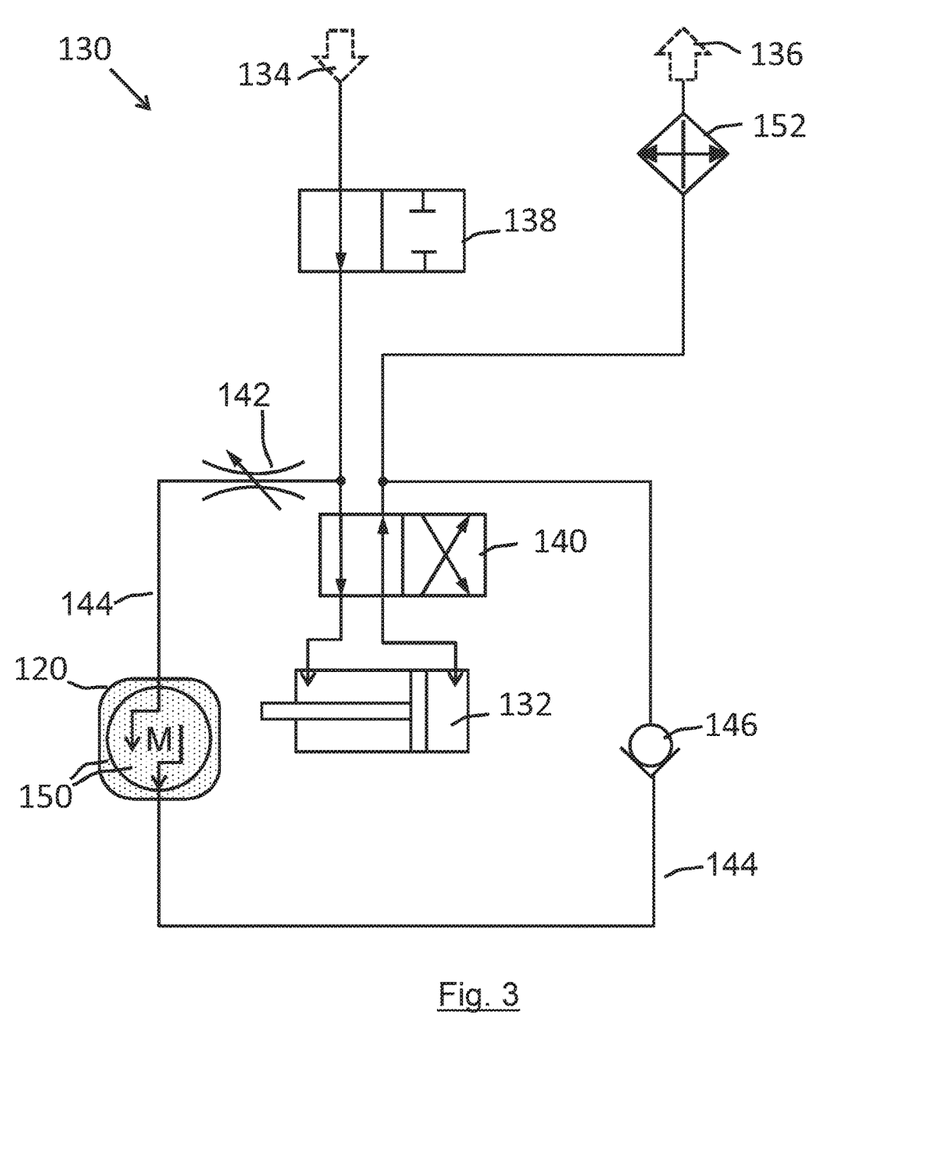
FIG. 3 shows schematically a hydraulic circuit featuring the e-taxi motor of the first embodiment.

FIG. 3 shows schematically a hydraulic circuit 130 connected to the yellow system, used to supply hydraulic fluid to the e-taxi motor 120. The circuit 130 also supplies fluid under pressure to an actuator 132 (mentioned in the paragraph immediately above) for selectively engaging/disengaging the e-taxi motor drive. The circuit has a supply line (represented by incoming arrow 134) and a return line (represented by outgoing arrow 136) which links the hydraulic circuit 130 to the rest of the yellow hydraulic system of the aircraft. The hydraulic circuit 130 is separated from the rest of the yellow hydraulic system of the aircraft by means of an aircraft-mounted two-way isolation valve 138. The actuator 132 is controllable by means of a four-way servo valve 140, which is able to move the actuator selectively in either direction. The pressure of the hydraulic fluid which powers the actuator 132 is at the operational pressure, that is, about 3000 psi. The same hydraulic fluid as is used to power the servo valve 140 and as is used in the rest of the yellow hydraulic system is used to cool the inner body of the e-taxi motor 120. The pressure is however reduced to about 150 psi (about 1 Mpa, or about 10 bar) before it is supplied to the e-taxi motor by means of a throttling valve 142, so that the section of the hydraulic circuit 130 in FIG. 3 labelled with the reference numeral 144 is at relatively low pressure. The motor is provided with internal channels for the flow of cooling liquid and in use the hydraulic fluid that is supplied as the cooling liquid flows within and around the motor. The motor 120 operates effectively immersed in hydraulic fluid 150. Hydraulic fluid heated by the motor then flows via a non-return valve 146 to the return line 136. The flow rate may be of the order of 8 litres per minute.

Optionally an aircraft mounted heat exchanger 152 may be provided, for example in the form of an air-cooled radiator that is positioned in a protected environment such as for example within the landing gear bay. It will be understood that the various components shown in FIG. 3 connected by lines in the diagram are in practice connected by means of suitable hydraulic fluid lines (conduits).

Figure 4:
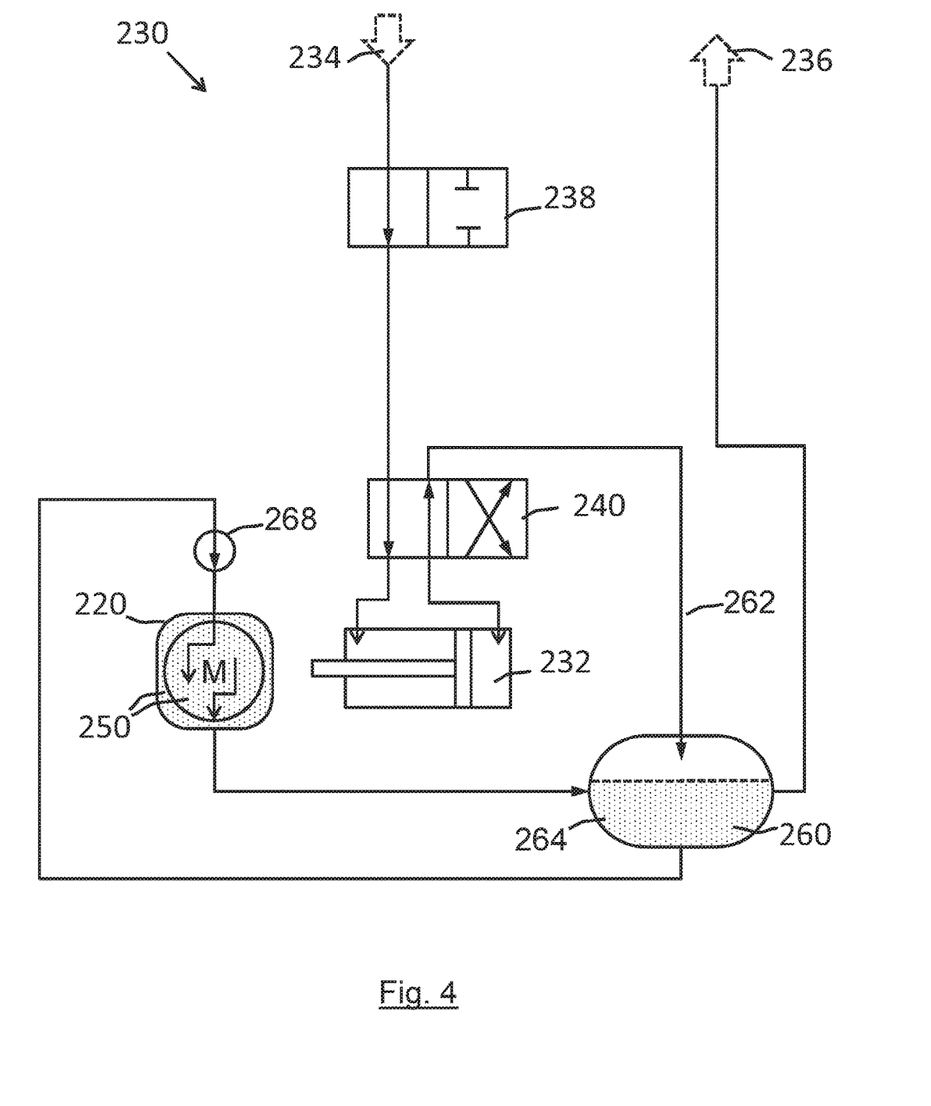
FIG. 4 shows schematically a hydraulic circuit for cooling an e-taxi motor according to a second embodiment.

FIG. 4 shows schematically a hydraulic circuit 230 for supplying hydraulic fluid for cooling an e-taxi motor 220 according to a second embodiment. In this embodiment, similar to the first embodiment, fluid is supplied under pressure (of 3,000 psi) to an actuator 232, via a servo valve 240, for selectively engaging/disengaging the e-taxi motor drive. The supply line to the circuit 230 is represented by incoming arrow 234 and the return line by outgoing arrow 236. The return line from the actuator 232 is represented by line 262. The circuit 230 forms part of the yellow hydraulic system of the aircraft, but can be isolated from the rest of the yellow hydraulic system by an isolation valve 238. A pressurised tank 260 receives fluid under pressure from the actuator return line 262. Overflow is passed back to the circuit return line (arrow 236) to the rest of the yellow hydraulic system. The tank 260 acts as a buffer between the return line 262 from the hydraulic actuator 232 and the main return line (arrow 236) and therefore provides a local reservoir 264 of constantly renewed, and therefore cooled (effectively), fluid. A local, electrically powered (same source of power as used by the e-taxi motor), low pressure hydraulic pump 268 pumps fluid from the reservoir 264 of fluid in the tank 260 to the motor 220 and back to the tank 260. The motor 220 is thus cooled by fluid 250 flowing through it. The pump 268, reservoir 264, and associated fluid lines, effectively form a local hydraulic fluid sub-system. An optional heat exchanger (not shown) may be provided in the line from the motor 220 to the tank 260.

Figure 5:
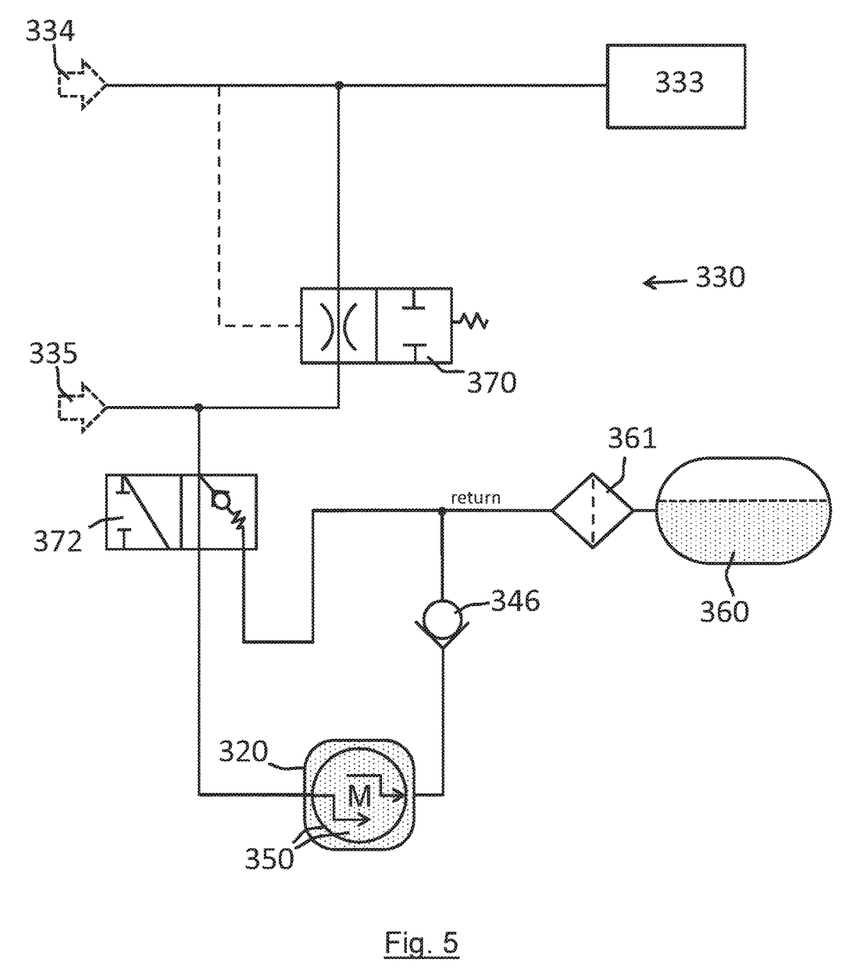
FIG. 5 shows schematically a hydraulic circuit for cooling an e-taxi motor according to a third embodiment.

FIG. 5 shows schematically a hydraulic circuit 330 for supplying low pressure hydraulic fluid for cooling an e-taxi motor 320 according to a third embodiment. In this embodiment, a reservoir 360 of hydraulic fluid is provided, but in this embodiment the reservoir is that of the main hydraulic system of the aircraft. The hydraulic system comprises a pump and accumulator and other supply/return lines which are not individually shown in FIG. 5. There is however shown a filter 361 which is associated with the reservoir 360. The supply of high pressure hydraulic fluid (from the yellow hydraulic system of the aircraft) to the systems or "consumers" (represented by box 333) that utilise high pressure fluid is shown schematically by arrow 334. A low pressure circuit/line is represented by arrow 335. Whilst not shown in FIG. 5, it will be understood that the system reservoir 360 in the low pressure circuit includes one or more supply lines for feeding hydraulic fluid to the hydraulic systems of the aircraft.

The low pressure circuit is separated from the high pressure circuit by means of a throttle/isolation valve 370 that sits between the high pressure and low pressure circuits. A pilot line (represented by the broken line in FIG. 5) controls the valve 370. The valve 370 may for example be actively closed when the aircraft is in flight mode. A pressure dependent sprung non-return/isolation/bypass valve 372 is provided for controlling flow of low pressure hydraulic fluid to the reservoir/e-taxi motor 320. In FIG. 5, the valve 372 is shown switched to the position in which hydraulic fluid is supplied to the motor 320. The valve 372 may be switched to isolate/bypass the motor 320 if and when so desired. The motor 320 is provided with internal channels for the flow of hydraulic fluid 350 that acts to cool the motor in use. Flow of hydraulic fluid 350 from the motor passes via a non-return valve 346 to the reservoir. Hydraulic fluid thus flows from supply lines of high pressure 334 and/or low pressure 335 via the e-taxi motor 320 before being returned to the reservoir 360. The embodiment utilises the return flow of hydraulic fluid of the electric motor pump (not shown) and the "consumers" (333) to provide fluid which passes through and cools the e-taxi motor. It may be possible to use high pressure flow which is reduced to low pressure via the throttle valve 370. The hydraulic fluid flowing via the motor as cooling fluid may be a combination of high pressure and/or low pressure flow depending on the load required. The low-pressure circuit, when supplying the c-motor with hydraulic fluid for cooling, may operate at a pressure of less than 1 MPa for example, of the order of 3 to 5 bar (0.3 to 0.5 MPa).

Figure 6:
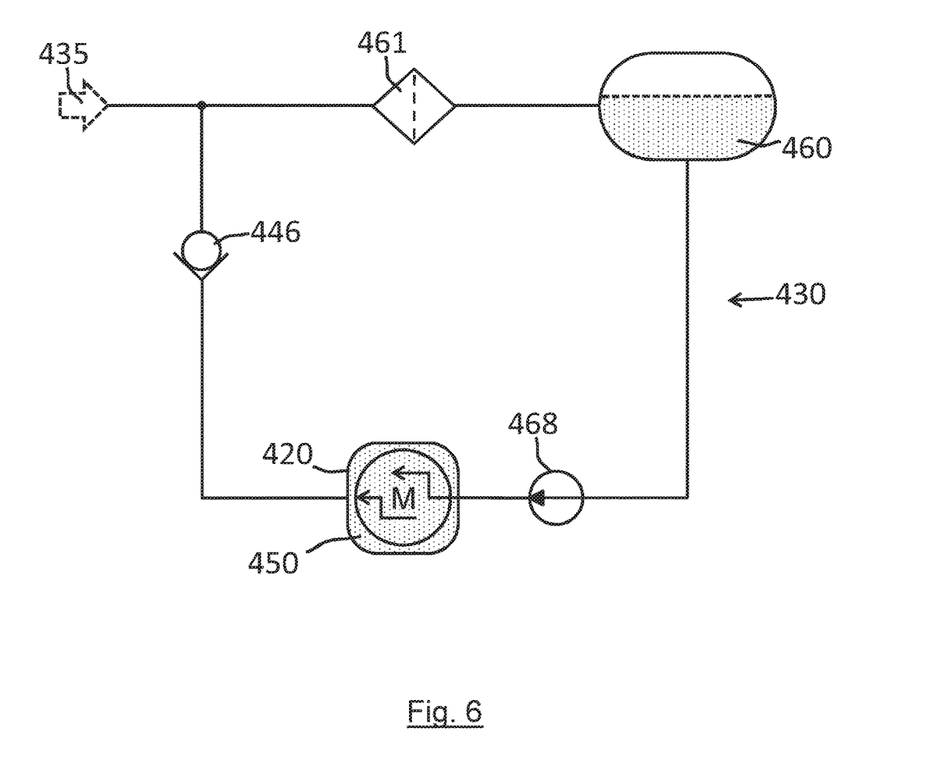
FIG. 6 shows schematically a hydraulic circuit for cooling an e-taxi motor according to a fourth embodiment.

FIG. 6 shows schematically a hydraulic circuit 430 for supplying low pressure hydraulic fluid for cooling an e-taxi motor 420 according to a fourth embodiment. In this embodiment, similar to the second embodiment, a reservoir 460 of hydraulic fluid is provided together with a 100W pump 468 for providing flow of low pressure fluid (about 10 to 20 bars) to the motor 420. FIG. 6 shows a filter 461 associated with the reservoir 460. The low pressure circuit/line is represented by arrow 435. In use hydraulic fluid 450 flows through the motor and cools it. Hydraulic fluid 450 from the motor passes via a non-return valve 446 back to the reservoir.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

An alternate architecture to that shown in FIG. 3 would be to have a bay-mounted servo valve, no non-return valve, and an independent throttled bleed on both sides of the actuator positioner.

The e-taxi motor, instead of being an electric powered motor, may be in the form of a hydraulic motor. The landing gear may be arranged to be held in fixed position (i.e. always deployed) or may be arranged to be moveable between a stowed (retracted) position and a deployed (extended) position.

The e-taxi system fitted to the aircraft may comprise an e-taxi motor fitted to each of the two MLGs of the aircraft, there being no motor on the NLG.

While mention is made of using the "yellow" hydraulic system in certain embodiments, it is possible to use other hydraulic systems of the aircraft to supply the hydraulic fluid that is used for cooling the e-taxi motor.

The hydraulic fluid used to cool the motor may be supplied at different pressures than described above. For example, the hydraulic fluid used to cool the motor may be supplied at a pressure that is chosen to be relatively low. In such a case, consideration may need to be given to dealing with any heat that might be generated when reducing the pressure of fluid supplied at high pressure to such a low pressure. The hydraulic fluid used to cool the motor may be supplied at a pressure that is chosen to be relatively high. In such a case, consideration may need to be given to the extra mass that might be needed in the motor casing/motor structure in order to deal with the higher pressures of cooling fluid.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft, comprising:
    a landing gear assembly on a part of which is mounted a liquid-cooled motor for driving a wheel of the landing gear assembly, and
    one or more hydraulically driven parts, and
    a hydraulic system for powering one or more hydraulically driven parts of the aircraft other than the liquid-cooled motor, the hydraulic system including a volume of hydraulic fluid and one or more hydraulic fluid conduits for carrying the hydraulic fluid to and/or from a location separate from the landing gear assembly,
    wherein the aircraft being so arranged that the hydraulic fluid is used as the liquid that cools the liquid-cooled motor.

2. An aircraft according to claim 1, wherein the liquid-cooled motor is an electric motor.

3. An aircraft according to claim 2, wherein the electric motor is configured to operate at an electric power of between 10 kW and 100 kW.

4. An aircraft according to claim 1, wherein the volume of hydraulic fluid is greater than 10 litres.

5. An aircraft according to claim 1, wherein the one or more hydraulically driven parts of the aircraft include one or more flight control surfaces of the aircraft.

6. An aircraft according to claim 1, wherein the hydraulic system is configured for powering one or more hydraulically driven parts of the aircraft with fluid at a relatively high pressure and the liquid-cooled motor is connected to the hydraulic system of the aircraft via a throttle which is configured to supply the hydraulic fluid which is used as the liquid that cools the liquid-cooled motor at relatively low pressure.

7. An aircraft according to claim 1, wherein the hydraulic system is configured for powering one or more hydraulically driven parts of the aircraft with fluid at a relatively high pressure and the liquid-cooled motor is connected to the hydraulic system of the aircraft via a pressurised tank which is configured to supply the hydraulic fluid which is used as the liquid that cools the liquid-cooled motor at relatively low pressure.

8. An aircraft according to claim 1, wherein the liquid-cooled motor is part of a larger drive system for driving the wheel of the landing gear assembly and the drive system includes at least one hydraulic actuator which is powered by means of hydraulic fluid supplied by the hydraulic system of the aircraft.

9. An aircraft according to claim 1, wherein the aircraft includes a heat exchange apparatus, which is arranged to receive hydraulic fluid heated by heat front the motor and to extract heat from the hydraulic fluid.

10. A liquid-cooled motor for use as the motor of claim 1.

11. A method of cooling a motor that is being used to drive a landing gear wheel of an aircraft landing gear assembly of an aircraft during taxiing manoeuvres of the aircraft, the method including
    circulating hydraulic fluid from a hydraulic system for powering one or more hydraulically driven parts of the aircraft to extract heat from the motor using the hydraulic fluid from the hydraulic system.

12. A method according to claim 11, wherein the pressure of at least some of the hydraulic fluid in the hydraulic system of the aircraft is greater than 10 MPa.

13. A method according to claim 11, wherein the pressure of at least some of the hydraulic fluid when used to cool the motor is less than 2.5 MPa.

14. A method according to claim 11, wherein the motor is at least partly immersed in a flow of the hydraulic fluid.

15. A method according to claim 11, wherein the hydraulic fluid flows within the interior of the motor.

16. An aircraft comprising:
    an e-taxi motor,
    one or more hydraulically driven parts,
    a hydraulic system for powering one or more hydraulically driven parts of the aircraft, the one or more hydraulically driven parts being separate from the e-taxi motor,
    a first hydraulic fluid conduit which conveys hydraulic fluid from said hydraulic system to the e-taxi motor for the purpose of cooling the e-taxi motor, and
    a second hydraulic fluid conduit which conveys hydraulic fluid that has extracted heat from the e-taxi motor, from the e-taxi motor back to the said hydraulic system.

17. An aircraft according to claim 16, wherein the one or more hydraulically driven parts of the aircraft include one or more flight control surfaces of the aircraft.

* * * * *